United States Patent [19]

Ruske et al.

[11] Patent Number: 4,942,232
[45] Date of Patent: Jul. 17, 1990

[54] IMIDAZOLYLMETHYLENE-CONTAINING TRIPHENDIOXAZINE DYES

[75] Inventors: Manfred Ruske, Ludwigshafen; Manfred Patsch, Wachenheim, both of Fed. Rep. of Germany

[73] Assignee: BASF Aktiengesellschaft, Ludwigshafen, Fed. Rep. of Germany

[21] Appl. No.: 279,202

[22] Filed: Dec. 2, 1988

[30] Foreign Application Priority Data

Dec. 3, 1987 [DE] Fed. Rep. of Germany ....... 3740978

[51] Int. Cl.$^5$ .................... C07D 413/10; C09B 57/00
[52] U.S. Cl. ....................................... 544/76; 544/99; 8/919
[58] Field of Search ................ 544/76, 99; 8/189, 919

[56] References Cited

U.S. PATENT DOCUMENTS

| | | | |
|---|---|---|---|
| 3,879,392 | 4/1975 | Nakanishi et al. | |
| 3,883,523 | 5/1975 | Parton | 548/76 |
| 3,892,742 | 4/1975 | Parton | 544/76 |
| 3,912,732 | 10/1975 | Burdeska et al. | 544/99 |
| 3,996,221 | 12/1976 | Leng et al. | 544/76 |
| 4,400,504 | 8/1983 | Harms et al. | 544/76 |
| 4,451,398 | 5/1984 | Patsch et al. | 548/148 |
| 4,532,323 | 4/1985 | Jager | 544/76 |
| 4,806,640 | 2/1989 | Harms et al. | 544/76 |

FOREIGN PATENT DOCUMENTS

| | | |
|---|---|---|
| 3510613 | 9/1986 | Fed. Rep. of Germany . |
| 1349513 | 4/1974 | United Kingdom . |
| 1353604 | 5/1974 | United Kingdom . |
| 2019872 | 1/1979 | United Kingdom . |
| 1559752 | 1/1980 | United Kingdom . |

*Primary Examiner*—Mukund J. Shah
*Assistant Examiner*—E. C. Ward
*Attorney, Agent, or Firm*—Oblon, Spivak, McClelland, Maier & Neustadt

[57] ABSTRACT

Imidazolylmethylene-containing triphendioxazine dyes of the formula I

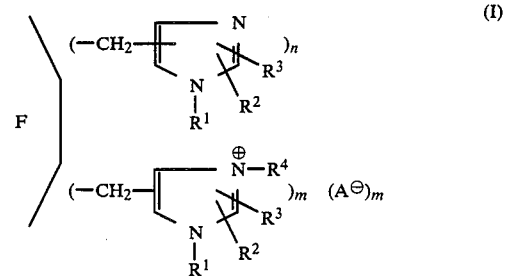

where $R^1$, $R^2$, $R^3$, $R^4$, m and n each have defined meanings, $A^\ominus$ is an anion and F is the radical of a triphendioxazine chromophore of the formula II

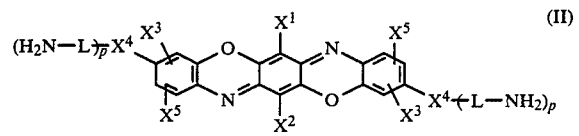

where $X^1$, $X^2$, $X^3$, $X^4$, $X^5$, L and p each have defined meanings, are useful for dyeing and printing material containing cellulose fibers.

10 Claims, No Drawings

IMIDAZOLYLMETHYLENE-CONTAINING TRIPHENDIOXAZINE DYES

The present invention relates to novel imidazolylmethylene-containing dyes where the chromophore is a triphendioxazine and to the use thereof for dyeing and printing material containing cellulose fibers.

DE-A-3,006,013 and DE-A-3,044,563 already disclose imidazolylmethylene-containing dyes.

It is an object of the present invention to provide new paper dyes having advantageous application properties.

We have found that this object is achieved with novel imidazolylmethylene-containing triphendioxazine dyes of the formula I

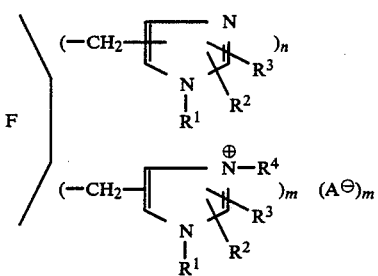

where
$R^1$ is hydrogen, $C_1$–$C_6$-alkyl, $C_2$–$C_5$-alkenyl or $C_2$–$C_3$-hydroxyalkyl,
$R^2$ and $R^3$ are identical or different and each is independently of the other hydrogen, $C_1$–$C_6$-alkyl or $C_2$–$C_5$-alkenyl,
$R^4$ is hydrogen, $C_1$–$C_6$-alkyl or $C_2$–$C_3$-hydroxyalkyl,
$A^\ominus$ is one equivalent of an anion,
m is from 0 to 4,
n is from 0 to 4, the sum of m+n being subject to the condition that $1 \leq (m+n) \leq 4$, and
F is the (m+n) valent radical of a triphendioxazine chromophore of the formula II

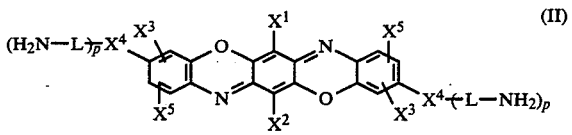

where
p is 0 or 1,
$X^1$ and $X^2$ are identical or different and each is independently of the other hydrogen or chlorine,
$X^3$ is hydrogen or hydroxysulfonyl,
$X^4$ is, if p is 0, amino, $C_1$–$C_6$-monoalkyl- or -dialkyl-amino, $C_2$–$C_4$-alkanoylamino, substituted or unsubstituted benzoylamino, $C_1$–$C_4$-alkoxy or substituted or unsubstituted phenoxy or, if p is 1, imino or $C_1$–$C_6$-alkylimino,
$X^5$ is chlorine, bromine, methyl, methoxy, sulfamoyl or $C_1$–$C_4$-monoalkyl- or -dialkyl-sulfamoyl and
L is $C_2$–$C_5$-alkylene,
with the proviso that the number of any sulfo groups present in the radical of the triphendioxazine chromophore is smaller than the number of protonatable and/or quaternizable nitrogen atoms.

All the alkyl groups appearing in the abovementioned formulae I and II can be not only straight-chain but also branched.

If substituted phenyl groups appear in the triphendioxazine chromophore of the formula II, suitable substituents are for example $C_1$–$C_4$-alkyl, $C_5$–$C_7$-cycloalkyl, $C_1$–$C_4$-alkoxy and halogen.

$R^1$, $R^2$, $R^3$ and $R^4$ are each for example methyl, ethyl, propyl, isopropyl, butyl, isobutyl, sec-butyl, tert-butyl, pentyl, isopentyl, neopentyl, tert-pentyl, hexyl, isohexyl, vinyl, allyl, methallyl or ethallyl.

$R^1$ and $R^4$ are each further for example 2-hydroxyethyl or 2- or 3-hydroxypropyl.

Anions $A^\ominus$ are for example chloride, sulfate, methosulfate, ethosulfate, methylsulfonate, benzenesulfonate, $C_1$–$C_{20}$-alkylbenzenesulfonate, such as 2- or 4-methylbenzenesulfonate, 2- or 4-(2-ethylhexyl)benzenesulfonate or 2- or 4-dodecylbenzenesulfonate, acetate, hydroxyacetate, methoxyacetate, propionate and lactate.

When p is 0, $X^4$ is for example mono- or dimethylamino, mono- or diethylamino, mono- or dipropylamino, mono- or diisopropylamino, mono- or dibutylamino, mono- or diisobutylamino, mono- or dipentylamino, mono- or dihexylamino, N-methyl-N-ethylamino, acetylamino, propionylamino, butyrylamino, isobutyrylamino, benzoylamino, 4-methylbenzoylamino, 4-ethylbenzoylamino, 2,4-dimethylbenzoylamino, 2-methoxybenzoylamino, 4-methoxybenzoylamino, 4-chlorobenzoylamino, 2-bromobenzoylamino, 2,6-dichlorobenzoylamino, methoxy, ethoxy, propoxy, isopropoxy, butoxy, isobutoxy, sec-butoxy, phenoxy, 4-methylphenoxy, 4-ethylphenoxy, 4-chlorohexylphenoxy, 2- or 4-methoxyphenoxy, 2-chlorophenoxy or 4-bromophenoxy.

When p is 1, $X^4$ is for example imino, methylimino, ethylimino, propylimino, isopropylimino, butylimino, isobutylimino, sec-butylimino, pentylimino or hexylimino.

$X^5$ is for example mono- or dimethylsulfamoyl, mono- or diethylsulfamoyl, mono- or dipropylsulfamoyl, mono- or diisopropylsulfamoyl, mono- or dibutylsulfamoyl or N-methyl-N-ethylsulfamoyl.

L is for example ethylene, trimethylene, tetramethylene, pentamethylene or methylethylene.

If sulfo groups are present in the dyes according to the invention, they are generally present in the form of the potassium, sodium or ammonium salts or combine with the protonatable nitrogen atoms present in the molecule to form a betain.

Preference is given to imidazolyl-containing triphendioxazine dyes of the formula I where $R^1$ is hydrogen or $C_1$–$C_4$-alkyl, in particular methyl or ethyl.

Preference is further given to triphendioxazine dyes of the formula I where $R^2$ is hydrogen or $C_1$–$C_4$-alkyl and $R^3$ is hydrogen.

Preference is further given to triphendioxazine dyes of the formula I where $R^4$ is $C_1$–$C_4$-alkyl or $C_2$–$C_3$-hydroxyalkyl, in particular methyl or 2-hydroxyethyl.

Preference is further given to triphendioxazine dyes of the formula I where $X^1$, $X^2$ and $X^3$ are each hydrogen.

If $(m+n) > 1$, the dyes of the formula I can be present in the form of mixtures of dyes where m and n are each 1, 2, 3 and/or 4, so that m and n can also be on average a fractional number.

Preferably, $(m+n)$ is from 1 to 4, possible values of m and n also including 0 (zero). Particular preference is given to dyes of the formula I where n is from 1 to 4 and m is 0.

The dyes according to the invention are based on the triphendioxazine chromophores of the abovementioned In a preferred version of the process, the imidazolylmethylation is carried out immediately after the formation of triphendioxazine II by cyclization of a 2,5-diarylamino-1,4-benzoquinone of the formula IV

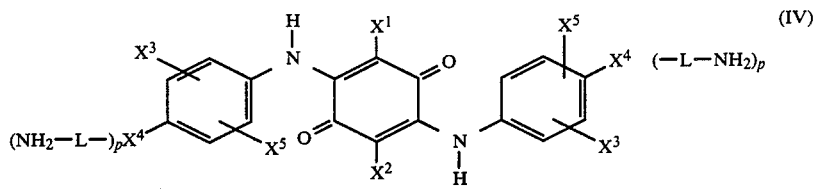

formula II. Said triphendioxazines II must be amidomethylatable. They are known or preparable in a known manner.

The novel compounds of the formula I where m is 0 can be obtained by reacting triphendioxazines II with anhydrous formaldehyde and imidazole compounds of the formula III

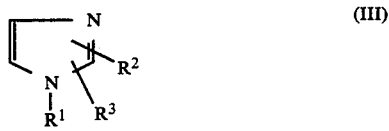

where $R^1$, $R^2$ and $R^3$ are each as defined above, in the presence of acidic agents.

The formaldehyde can be employed in the reaction in monomeric form or preferably in polymeric form, for example in the form of paraformaldehyde or trioxane.

Imidazoles III are employed in an amount which is not less than that required by the stoichiometry of the reaction, advantageously in an excess together with anhydrous formaldehyde (in general about 1 mole of formaldehyde per mole of III).

The reaction to give the novel dyes I may also be carried out with C-hydroxymethylimidazoles prepared beforehand from III and anhydrous formaldehyde, for example 4-hydroxymethyl-5-methylimidazole or 4-methyl-5-hydroxymethylimidazole. Imidazoles III can also be employed in the form of their hydrochlorides.

The reaction takes place in general at from 0° to 140° C., preferably at from 0° to 100° C. The reaction time, which in general is from 1 to 48 hours, depends on the triphendioxazine II, the number of methyleneimidazole groups to be introduced into II, the acidic agent and the reaction temperature.

Suitable acidic agents which can also serve as the reaction medium are for example phosphoric acid and from 80 to 100% strength by weight sulfuric acid, with or without water-eliminating agents, such as sulfur trioxide, phosphorus pentoxide, metaphosphoric acid, polyphosphoric acid, acetic anhydride, benzenesulfonic acid or toluenesulfonic acid. A preferred acidic agent which also serves as the reaction medium is from 96 to 100% strength by weight sulfuric acid or oleum up to 12% strength by weight.

It is also possible to introduce one or more sulfo groups into the triphendioxazine radical in the course of the reaction of II with III in sulfuric acid or oleum during or after the reaction.

The imidazolylmethylation of those triphendioxazines II which have more than one sulfo group from the start in sulfuric acid is generally found to eliminate at least one sulfo group in the course of the reaction.

where $X^1$, $X^2$, $X^3$, $X^4$, $X^5$, L and p are each as defined above, in sulfuric acid or oleum, if necessary after correction of the acid concentration by means of ice or water.

The ring closure of benzoquinones IV can be carried out in a conventional manner as disclosed in DE-A-2,122,262, DE-A-2,124,080, DE-A-2,302,383, DE-A-2,344,781, DE-A-2,503,611, DE-A-2,823,828, DE-A3,510,613 or GB-A-2,019,872, for example in concentrated sulfuric acid or oleum ($SO_3$ content from 1 to 50%) at from 10° to 80° C., in the presence or absence of oxidizing agents, such as potassium peroxodisulfate, ammonium peroxodisulfate, manganese oxide or organic peroxides.

Further ring closure methods, for example in oleum in the presence of iodine or inorganic iodine compounds (EP-A-141,359) or in the presence of organic iodine compounds (earlier Application DE-A-3,735,057), are particularly highly suitable for combining the two steps of cyclization and imidazolylmethylation.

In some cases it can also be advantageous to carry out the cyclization of benzoquinones IV in solvents in a conventional manner, for example by heating benzoquinone IV at from 150° to 210° C. in an inert organic solvent, such as o-dichlorobenzene, trichlorobenzene, nitrobenzene, naphthalene or chloronaphthalene, in the presence or absence of an acid halide, for example benzoyl chloride, p-toluenesulfonyl chloride or thionyl chloride (DE-A-2,322,892, DE-A-3,045,471).

It is also possible to prepare those triphendioxazines of the formula II which have an amino group by reacting benzoquinone IV with a diamine as described in DE-A-2,823,828.

The dyes of the formula I according to the invention where m is 0 are precipitated by discharging the reaction mixture onto water or ice-water and filtered off. If they are partially or completely soluble in the dilute aqueous acid, they are precipitated by addition of basic agents, for example sodium hydroxide solution, potassium hydroxide solution or ammonia, in the form of the free base and separated off by filtration and dried or used in the form of the water-moist press cake.

The conversion into those dyes of the formula I where m>0 is effected by protonation, ie. by dissolving the free base in a dilute acid, or by quaternization, ie. by reaction with an alkylating agent of the formula alk-Y where alk is $C_1$–$C_6$-alkyl or $C_2$–$C_3$-hydroxyalkyl and Y is a leaving group, for example chlorine, bromine, methosulfate or ethosulfate, in a conventional manner.

The dyes of the formula I according to the invention are readily to very readily soluble in water in a protonated or quaternized form. In the form of the free base they are very readily soluble in dilute acids with salt formation. Suitable acids are for example those acids whose anions A⊖ are listed above.

The novel dyes of the formula I are usable in the cationized form for dyeing and printing cellulose fiber materials, in particular for the wet-end coloring of paper. The paper colored with the novel dyes has a high resistance to bleeding. If the dyes according to the invention are employed in the production of colored paper, the waste waters are in general uncolored.

The examples below serve to illustrate the invention in more detail. Percentages are by weight, unless otherwise stated.

EXAMPLE 1

142.6 g of 6,13-dichloro-3,10-bis(benzoylamino)triphendioxazine were added into a previously prepared mixture of 1200 g of sulfuric acid monohydrate, 79 g of 4-methylimidazole and 29 g of paraformaldehyde at from 25° to 40° C., and the reaction solution was stirred at from 50° to 52° C. for 8 hours. The reaction solution was precipitated in ice-water, and the mixture was brought to pH 9 at from 25° to 30° C. with aqueous ammonia. The precipitate was filtered off, washed with water until neutral and salt-free, and dried.

Yield: 105 g of a blue dye mixture of the formula

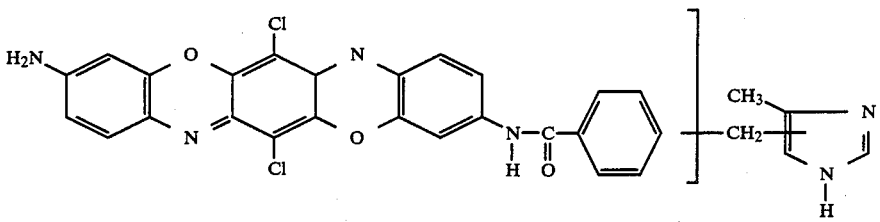

$C_{30}H_{20}Cl_2N_6O_3$ (583) calculated Cl 12.2%, N 14.4%; found Cl 13.6%, N 14.8%.

The color base is very readily soluble in dilute acetic acid ($\lambda_{max}$ 558.6 nm) and exhausts quantitatively from this solution onto bleached pulp. The waste water is colorless. Both the resistance to bleaching of the reddish blue coloring on paper and the light fastness are very good.

EXAMPLES 2 AND 3

These examples were carried out similarly to Example 1, except that the 6,13-dichloro-3,10-bis(benzoylamino)triphendioxazine was replaced in one instance by 6,13-dichloro-3,10-bis(2-methylbenzoylamino)triphendioxazine (Example 2) and in the other instance by 6,13-dichloro-3,10-bis(4-methylbenzoylamino)triphendioxazine (Example 3). Color bases having similar properties were obtained.

EXAMPLE 4

7.9 g of 6,13-dichloro-3,10-bis(2-amino-2-methylethylamino)triphendioxazinedisulfonic acid (prepared as described in DE-A-3,510,613) were dissolved in 44 g of sulfuric acid monohydrate. 3.2 g of 4-methylimidazole and 1.2 g of paraformaldehyde were added at from 23° to 40° C., and the reaction solution was stirred at from 58° to 59° C. for 12 hours. The reaction solution was then precipitated in ice-water, the mixture was brought to pH 9 with sodium peroxide solution and aqueous ammonia. The precipitated color base was isolated and dried.

Yield: 7.4 g of a blue dye mixture of the formula

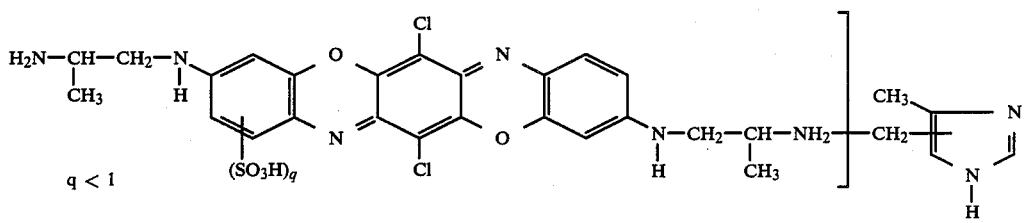

$C_{29}H_{30}Cl_2N_8O_5S$ (673) calculated Cl 10.5%, N 16.6%, S 4.7%; found Cl 11.0%, N 17.0%, S 1.7%.

The color base gives a deep blue solution in dilute acetic acid ($\lambda_{max}$ 576.6 nm) and exhausts quantitatively from this solution onto bleached pulp. The waste water is colorless. The brilliant blue coloring on paper has a high fastness level.

EXAMPLE 5

15 g of 2,5-dichloro-3,6-bis[(4-(3-aminopropylamino)-3-hydroxysulfonylphenyl)-amino]benzoquinone were added at from 20° to 25° C. to a mixture of 90 g of 2% strength oleum and 6 g of potassium peroxodisulfate. A further 6 g of potassium peroxodisulfate were then added a little at a time and stirred in at 25° C. for 2 hours. 6.4 g of 4-methylimidazole and 2.3 g of paraformaldehyde were added at from 20° to 40° C. The reaction mixture was heated to 58° C., stirred at 58° C. for 10 hours, and precipitated in ice-water, and the mixture was initially brought to pH 6.5 with dilute sodium hydroxide solution and then to pH 9.8 with aqueous ammonia. The precipitated color base was filtered off with suction and washed until electrolyte-free.

Yield: 14.7 g of product of the formula

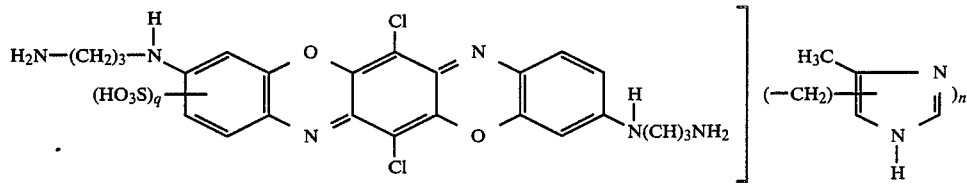

q < 1

(Mixture of components with n=1 and n=2, the component with n=1 being predominant.) For $C_{29}H_{30}Cl_2N_8O_5S$ (673) calculated N 16.6%, S 4.7%, Cl 10.5%; found N 16.5%, S 3.5%, Cl 9.5%.

The color base gives a deep blue solution in dilute acetic acid ($\lambda_{max}$ 564.6 nm). Bleached pulp is colored in a deep blue shade.

The resistance to bleeding and the light fastness of the coloring on paper are very good.

EXAMPLE 6

19 g of 2,5-dichloro-3,6-bis[(4-(2-aminoethylamino)-3-hydroxysulfonylphenyl)amino]benzoquinone were added at from 20° to 25° C. to a mixture of 137 g of 40% strength oleum and 0.4 g of iodobenzene, and the mixture was stirred at from 22° to 25° C. for 16 hours. 13 g of ice-water were then added dropwise at the temperature, followed at from 20° to 40° C. by 8.8 g of 4-methylimidazole and 3.2 g of paraformaldehyde, the reaction solution was stirred at 58° C. for 12 hours. The reaction solution was then discharged onto ice-water, and the mixture was brought to pH 9 with aqueous ammonia. The precipitated color base was filtered off with suction, washed and dried.

Yield: 17 g of dark blue powder which gives a deep blue solution in dilute acetic acid. The waste water from the wet-end coloring of paper made of bleached pulp is almost colorless. The colorings on paper are highly resistant to bleeding.

EXAMPLE 7

23.5 g of 2,5-dichloro-3,6-bis[(4-amino-3-hydroxysulfonylphenyl)amino]benzoquinone, 235 g of 20% strength oleum and 0.24 g of potassium iodide were stirred at from 25° to 30° C. for 16 hours. 10.5 ml of ice-water, 14 g of 4-methylimidazole and 5.1 parts of paraformaldehyde were then added. The reaction mixture was stirred at from 65° to 70° C. for 24 hours, discharged onto ice-water and precipitated with aqueous ammonia at pH 8.5, and the precipitate was filtered off with suction and washed.

Yield: 22.4 g of a dark blue powder. $C_{23}H_{16}Cl_2N_2N_6O_5S$ (559) calculated C 49.37%, H 2.86, Cl 12.7%, N 15.04%, S 5.7%; found C 49.5%, H 3.4%, Cl 13.2%, N 14.6%, S 6.9%.

The dye colors bleached pulp from an acetic acid solution in a reddish blue shade.

EXAMPLE 8

18.9 g of 6,13-dichloro-3,10-diphenoxytriphendioxazine were added to a mixture of a condensation product of 170 g of a 96% strength sulfuric acid, 5.8 g of 4-methylimidazole and 2.1 g of paraformaldehyde at from 15° to 20° C. and stirred in at 25° C. for 3 hours. The reaction solution was precipitated in water, the mixture was brought to pH 9.5 with aqueous ammonia and the precipitate was filtered off with suction, washed and dried.

Yield: 28 g of a red dye powder conforming predominantly to the formula

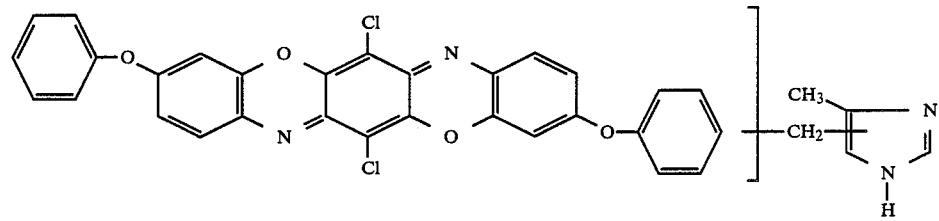

$C_{35}H_{22}ClN_4O_4$ (633) calculated N 8.8%, Cl 11.2%; found N 11.0%, Cl 9.04% S 0.29%.

As is evident from the elemental analysis, the dye powder also contains a small amount of a sulfonated component.

The color base gives a red solution in dilute acetic acid ($\lambda_{max}$ 511.1 nm) and dyes bleached pulp in a bluish red having a high resistance to bleeding and a good light fastness.

The method of Example 8 also gives dyes if the triphendioxazines listed in the table below are used as starting materials. The dyes are red color bases which dye bleached pulp from dilute acetic acid into bluish red shades.

| Ex. No. | Amount [g] | Triphendioxazine |
|---|---|---|
| 9 | 21.35 | 6,13-dichloro-3,10-bis(4-chlorophenoxy)-triphendioxazine |
| 10 | 24.6 | 6,13-dichloro-3,10-bis(4-cyclohexylphenoxy)triphendioxazine ($\lambda_{max}$ 511 nm; 543.6 nm) |
| 11 | 19.8 | 6,13-dichloro-3,10-bis(4-methylphenoxy)-triphendioxazine |
| 12 | 20.9 | 6,13-dichloro-3,10-bis(4-methoxyphenoxy)-triphendioxazine |

APPLICATION EXAMPLE 1

50 g of a mixture composed of 30% of birch sulfate pulp and of 70% of pine sulfate pulp were beaten in one liter of water (10° German hardness) at room temperature to form a fiber suspension, which was then diluted with 1 liter of the same water. The suspension was admixed with a mixture of 2 g of a 10% strength acetic acid solution of the dye of Example 1 and 10 ml of water by slowly stirring for 15 minutes, and the mixture was then diluted with water to a solids content of 0.5%. This suspension was used to prepare 80 g/m² sheets of paper on a laboratory sheet former from Franck, and the moist sheets were dried at 100° C. for 5 minutes. A blue-colored paper was obtained. The waste water was colorless. The colored paper has a very high resistance to bleeding (German Standard Specification DIN 53,991) and a very good light fastness.

Similar results are obtained on replacing the mixture of birch sulfate pulp/pine sulfate pulp by pine sulfite pulp or pine sulfate pulp. Reddish blue papers are obtained, again with excellent fastness properties.

APPLICATION EXAMPLE 2

15 kg of waste paper (wood-containing), 25 kg of bleached groundwood and 10 kg of unbleached sulfate pulp were beaten in a pulper to give a 3% strength aqueous stock suspension. The stock suspension was diluted in a dye vat to 2%. This suspension was then admixed in succession with 0.5% of soluble, oxidatively degraded corn starch, 5% of kaolin (each based on dry fiber) and 1.25 kg of a 5% strength acetic acid solution of the dye of Example 5 by stirring. After 20 minutes the stock was admixed in a mixing vat with 1% (based on absolutely dry fiber) of a resin size dispersion. The homogeneous stock suspension was adjusted with alum to pH 5 on a paper machine at a short distance upstream of the headbox.

The paper machine was used to produce machine-finished 80 g/m² bag paper having a medium blue shade and a high resistance to bleeding as determined in accordance with German Standard Specification DIN 53,991.

APPLICATION EXAMPLE 3

25 kg of catalog paper (reject material), 60 kg of bleached groundwood (65° Schopper Riegler) and 15 kg of unbleached sulfite pulp were beaten in a pulper in 2500 l of water. The 4% strength aqueous stock suspension was admixed with 0.4% of soluble starch, 16% of kaolin and 2% of talc (each based on dry fiber). The stock suspension was then beaten in a refiner to a freeness of 45° Schopper Riegler. The stock suspension was admixed with 12 kg of a 10% strength acetic acid solution of the dye of Example 6 (≙1% of dry dye on weight of absolutely dry fiber). After an aging period of 15 minutes, a resin size dispersion was added to the stock in an amount of 0.6% of dry weight on weight of absolutely dry fiber. After 10 minutes the stock flowing out of the mixing vat was continuously diluted with water to a solids content of 0.8% and continuously adjusted to pH 4.5 with alum (Al₂(SO₄)₃.18H₂O), the pH being measured in the drainage water, and pumped into the headbox. The result obtained was a blue catalog paper (60 g/m²) of high water resistance and good light fastness.

On replacing the dye of Example 6 by the dyes of Examples 8 to 11 bluish red papers are obtained, again with good wet fastness properties.

We claim:

1. An imidazolylmethylene-containing triphendioxazine dye of the formula I:

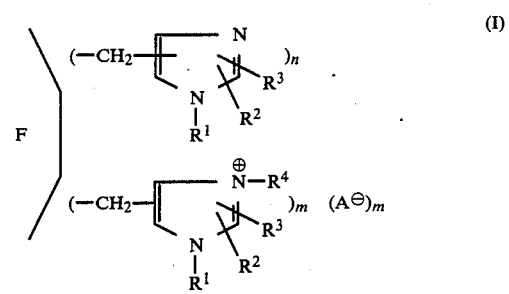

wherein $R^1$ is hydrogen, $C_1$–$C_6$-alkyl, $C_2$–$C_5$-alkenyl or $C_2$–$C_3$-hydroxyalkyl, $R^2$ and $R^3$ are identical or different and each is independently of the other hydrogen, $C_1$–$C_6$-alkyl or $C_2$–$C_5$-alkenyl, $R^4$ is hydrogen, $C_1$–$C_6$-alkyl or $C_2$–$C_3$-hydroxyalkyl, $A^-$ is one equivalent of an anion, m is from 0 to 4, n is from 0 to 4, the sum of m+n being subject to the condition that $1 \leq (m+n) \leq 4$, and F is the (m+n) valent radical of a triphendioxazine chromophore of the formula II:

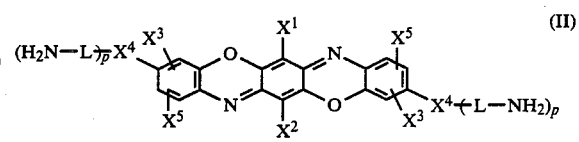

wherein p is 0 or 1, $X^1$ and $X^2$ are identical or different and each is independently of the other hydrogen or chlorine, $X^3$ is hydrogen or hydroxysulfonyl, $X^4$ is, when p is 0, amino, substituted or unsubstituted benzoylamino, or substituted or unsubstituted phenoxy or, when p is 1, imino or $C_1$–$C_6$-alkylimino, $X^5$ is chlorine, bromine, methyl, methoxy, sulfamoyl or $C_1$–$C_4$-monoalkyl- or -dialkyl-sulfamoyl and L is $C_2$–$C_5$-alkylene, with the proviso that the number of any sulfo groups present in the radical of the triphendioxazine chromophore is smaller than the number of protonatable nitrogen atoms, quaternizable nitrogen atoms or both.

2. The imidazolylmethylene-containing triphendioxazine dye as claimed in claim 1, wherein $R^1$ is hydrogen or $C_1$–$C_4$-alkyl.

3. The imidazolylmethylene-containing triphendioxazine dye as claimed in claim 1, wherein $R^2$ is hydrogen or $C_1$–$C_4$-alkyl and $R^3$ is hydrogen.

4. The imidazolylmethylene-containing triphendioxazine dye as claimed in claim 1, wherein $R^4$ is $C_1$–$C_4$-alkyl or $C_2$–$C_3$-hydroxyalkyl.

5. The imidazolylmethylene-containing triphendioxazine dye as claimed in claim 1, wherein $X^1$, $X^2$ and $X^3$ are each hydrogen.

6. A method of dyeing and printing material containing cellulose fibers, which comprises contacting said material with the imidazolylmethylene-containing triphendioxazine dye of claim 1.

7. The imidazolylmethylene-containing triphendioxazine dye as claimed in claim 1, wherein said anion $A^-$ comprises chloride, sulfate, methosulfate, ethosulfate, methylsulfonate, benzenesulfonate, $C_1$–$C_{20}$-alkylbenzenesulfonate, acetate, hydroxyacetate, methoxyacetate, propionate and lactate.

8. The imidazolylmethylene-containing triphendioxazine dye as claimed in claim 1, wherein said substituted benzoylamino is 4-methylbenzoylamino, 4-ethylbenzolamino, 2,4-dimethylbenzoylamino, 2-methoxybenzoylamino, 4-methoxybenzoylamino, 4-chlorobenzoylamino, 2-bromobenzoylamino or 2,6-dichlorobenzoylamino.

9. The imidazolylmethylene-containing triphendioxazine dye as claimed in claim 1, wherein said substituted phenoxy is 4-methylphenoxy, 4-ethylphenoxy, 4-cyclohexylphenoxy, 2- or 4-methoxyphenoxy, 2-chlorophenoxy or 4-bromophenoxy.

10. The imidazolymethylene-containing triphendioxazine dye as claimed in claim 1, wherein m is 0, and n is 1 to 4.

* * * * *